(12) United States Patent
Berger et al.

(10) Patent No.: US 7,160,225 B2
(45) Date of Patent: Jan. 9, 2007

(54) METHOD, DEVICE AND USE THEREOF FOR OPERATING A MOTOR VEHICLE

(75) Inventors: Reinhard Berger, Buhl (DE); Klaus Kupper, Buhl (DE); Georg Schneider, Karlsruhe (DE)

(73) Assignee: Luk Lamellen und Kupplungsbau Beteiligungs, Buehl (DE)

( * ) Notice: Subject to any disclaimer, the term of this patent is extended or adjusted under 35 U.S.C. 154(b) by 0 days.

(21) Appl. No.: 10/711,851

(22) Filed: Oct. 8, 2004

(65) Prior Publication Data

US 2005/0090370 A1  Apr. 28, 2005

Related U.S. Application Data

(63) Continuation of application No. PCT/DE03/01192, filed on Apr. 10, 2003.

(30) Foreign Application Priority Data

Apr. 10, 2002 (DE) ............................ 102 15 715
Aug. 24, 2002 (DE) ............................ 102 38 866

(51) Int. Cl.
  *B60W 10/02* (2006.01)
  *B60W 10/04* (2006.01)

(52) U.S. Cl. ........................ 477/5; 477/167; 477/176

(58) Field of Classification Search .................. 477/5, 477/6, 8, 167, 176
See application file for complete search history.

(56) References Cited

U.S. PATENT DOCUMENTS

| 3,888,325 | A | * | 6/1975 | Reinbeck ................ 180/65.2 |
| 4,533,011 | A |  | 8/1985 | Heidemeyer et al. |
| 6,149,544 | A | * | 11/2000 | Masberg et al. ............. 477/13 |
| 6,244,368 | B1 | * | 6/2001 | Ando et al. ................ 180/65.2 |
| 6,336,889 | B1 |  | 1/2002 | Oba et al. |
| 6,482,127 | B1 | * | 11/2002 | Katou ........................ 477/192 |
| 6,491,602 | B1 | * | 12/2002 | Hohn ............................ 477/5 |
| 6,705,416 | B1 | * | 3/2004 | Glonner et al. ........... 180/65.2 |
| 6,740,002 | B1 | * | 5/2004 | Stridsberg .................... 477/14 |
| 6,808,470 | B1 | * | 10/2004 | Boll .............................. 477/6 |
| 6,887,180 | B1 | * | 5/2005 | Pels et al. ...................... 477/3 |
| 2004/0157704 | A1 | * | 8/2004 | Stork et al. ................ 477/166 |
| 2005/0051371 | A1 | * | 3/2005 | Masterson ................ 180/65.2 |

FOREIGN PATENT DOCUMENTS

| DE | 19838853 |  | 3/1999 |
| DE | 19814402 |  | 10/1999 |
| DE | 19917665 | A1 * | 10/2000 |
| DE | 10228709 | A1 * | 2/2003 |
| EP | 1177930 |  | 2/2002 |
| WO | WO 0156824 |  | 8/2001 |
| WO | WO 2004111441 | A1 * | 12/2004 |

* cited by examiner

*Primary Examiner*—Sherry Estremsky
(74) *Attorney, Agent, or Firm*—Simpson & Simpson, PLLC (57) ABSTRACT

A method, a device, and use thereof for operating a motor vehicle having a drive motor and a transmission in the drive train are proposed.

29 Claims, 7 Drawing Sheets

For Starting Relevant Program Parts of the Control System

Program Run for Calculation of Electric Motor Startup Torque

METHOD, DEVICE AND USE THEREOF FOR OPERATING A MOTOR VEHICLE

CROSS-REFERENCE TO RELATED APPLICATIONS

This application is filed under 35 U.S.C. §120 and §0365 (c) as a continuation of International Patent Application PCT/DE03/01192, filed Apr. 10, 2003, which application is incorporated herein by reference. This application also claims priority of German Patent Applications Nos. 102 15 715.4, filed Apr. 10, 2002, and 102 38 866.0 filed Aug. 24, 2002, which applications are incorporated herein by reference.

BACKGROUND OF THE INVENTION

This invention relates to a method, a device and its use for the operation of a motor vehicle with a drive motor and a gearbox in the power train.

SUMMARY OF THE INVENTION

The present invention broadly comprises a method for the operation of a motor vehicle, especially the control of a vehicle power train by means of a crankshaft starter generator, wherein the associated starter generator between the two clutches of the crankshaft is operated for the purpose of turning on the combustion engine at the moment at which the gearbox clutch changes into the sliding state and the power takeoff is disconnected from the drive. The invention also includes an apparatus to implement the method.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
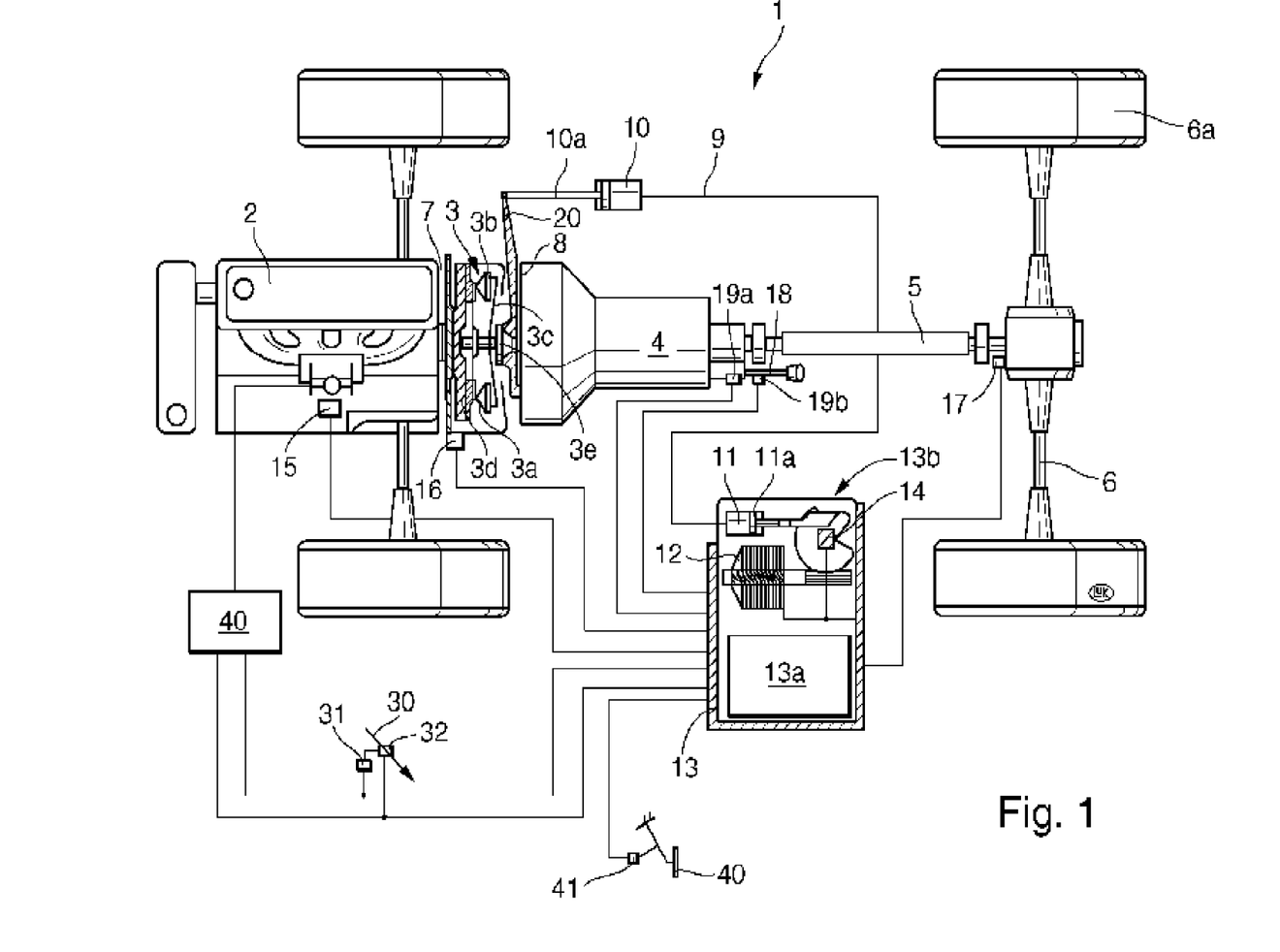
FIG. 1 is a cross sectional view of the device for the operation of a motor vehicle with a drive motor and a gearbox in the power train of the present invention.

According to FIG. 1, a vehicle 1 has a drive unit 2 such as a motor or a combustion engine. Furthermore, a torque transmission system 3 and a gear 4 are arranged in the power train of vehicle 1. In this exemplary embodiment, the torque transmission system 3 is placed in the flow of force between the motor and the gear and a drive torque of the motor is transmitted via the torque transmission system 3 to gear 4 and from gear 4 on the power output side to a power takeoff shaft 5 and a series-connected axle 6 as well as to wheels 6a.

The torque transmission system 3 is designed as a clutch, for example, as a friction clutch, as a multiple-disc clutch, as a magnetic powder clutch or as a converter bridge clutch where the clutch can be a self-adjusting or a wear-adjusting clutch. Gear 4 is an uninterruptible gearbox (USG). According to the idea behind the invention, the gear can also be an automated gearbox (ASG), which can be shifted in an automated manner at least by means of one actuator. Automated gearbox is intended to mean, in the broader sense, an automated gear that is shifted with traction force interruption and where the shifting process involved in gear translation is performed in a selected manner by at least one actuator.

As a USG, one can furthermore also use an automated gear where an automated gear is a gear essentially without traction force interruption during the gear shifting procedures and that, as a rule, is made up of by means of planetary gear steps.

One can furthermore use a phaselessly adjustable gear such as, for example, a taper disc loop gear. The automated gear can also be made with a torque transmission system 3, arranged on the power takeoff side, such as a clutch or a friction clutch. The torque transmission system 3 furthermore can be made as a starter clutch and/or a turn rate clutch for the reversal of direction and/or a safety clutch with a torque that can be transmitted in a specifically selectable manner. The torque transmission system 3 can be a drive friction clutch or a wet running friction clutch, which, for example, runs in a fluid. By the same token, it can be a torque converter.

The torque transmission system 3 has a pinion end 7 and a power takeoff side 8, whereby a torque is transmitted from the pinion end 7 to the power takeoff side 8 in that, for example, clutch disc 3a is force-impacted by means of pressure plate 3b, disc spring 3c and clutch release bearing 3e as well as flywheel 3d. The clutch release fork lever 20 is operated by means of an actuation device, for example, an actuator, to bring about this force impacting.

The torque transmission system 3 is selected by means of a control unit 13 such as, for example, a control device that can encompass the control electronics 13a and actuator 13b. In another advantageous embodiment, actuator 13b and control electronics 13a can also be arranged in two different structural units such as, for example, housings.

Control unit 13 can contain the control and power electronics for selecting the drive motor 12 of actuator 13b. As a result, for example, one can make sure in an advantageous manner that the system by way of a single structural space will require the structural space for actuator 13b with the electronics. Actuator 13b consists of a drive motor 12 such as, for example, an electric motor where electric motor 12 acts upon a transmitter cylinder 11 via a gear, for example, a worm gear, a spur pinion, a crank gear or a threaded spindle gear. This effect upon the transmitter cylinder 11 can take place directly or via a rod assembly.

The movement of the output part of actuator 13b such as, for example, the transmitter cylinder piston 11a, is detected by means of a clutch travel sensor 14, which detects the position or location or the speed or acceleration of a magnitude that is proportional to the position or gear mesh position, respectively, of the speed or acceleration of the clutch. Transmitter cylinder 11 is connected by means of a pressure medium line 19, for example, a hydraulic line, to the slave cylinder 10. Output element 10a of the slave cylinder is action-connected with the clutch release means 20, for example, a clutch release lever, so that a movement of the output part 10a of the slave cylinder 10 will cause the clutch release means 20 to also be moved or tilted in order to select the torque that can be transmitted from clutch 3.

Actuator 13b for selecting the transmissible torques of the torque transmission system 3 can be activated by a pressure medium; that is to say, it can have a pressure medium transmitter and slave cylinder. The pressure medium, for example, can be a hydraulic fluid or a pneumatic medium. The pressure medium transmitter cylinder can be operated by means of an electric motor, whereby the electric motor provided as drive element 12 can be selected electronically. Drive element 12 of actuator 13b, in addition to an electric motor drive element, can also be another drive element, for example, a drive element that is operated by a pressure medium. Furthermore, magnetic actuators can be used to set a position of an element.

In case of a friction clutch, a transmissible torque is selected in the following manner: The friction linings of the clutch disc are pressed on in a specifically targeted manner between flywheel 3d and pressure plate 3b. Via the position of the clutch release means 20 such as, for example, a clutch fork or a central releasing device, the force impacting of the pressure plate 3b or of the friction linings can be selected in a specific manner, whereby pressure plate 3b is moved and adjusted and fixed as desired between two terminal positions. One terminal position corresponds to a clutch position that is completely engaged and the other terminal position corresponds to a clutch position that is completely disengaged. To select a transmissible torque, which, for example, will be less than the momentarily applied motor torque, for example, one can select a position of pressure plate 3b that lies in an interval between the two terminal positions. The clutch can be fixed in this position by means of the specifically directed selection of the clutch release means 20. One can also select transmissible clutch torques that lie over the momentarily applied motor torques in a defined manner. In such a case, the currently applied motor torques can be transmitted, whereby the torque irregularities are attenuated and/or isolated in the power train in the form, for example, of torque peaks.

Sensors are also used to select the torque transmission system 3; these sensors, at least from time to time, monitor the relevant magnitudes of the entire system and supply the state magnitudes, signals and measurement values necessary for control, which data are processed by the control unit, whereby a signal connection can be provided and can exist to other electronics units such as, for example, a motor electronics unit or an electronics unit of an antilock system (ABS) or an anti-slip regulator (ASR). The sensors, for instance, detect rotation numbers, wheel rotation numbers, engine rotation numbers, the position of the load lever, the throttle valve position, the gear position of the gearbox, the gearshift intention and other parameters that are specifically related to the vehicle.

FIG. 1 shows that a throttle valve sensor 15, a motor revolution sensor 16, as well as a tachosensor 17 can be used and can relay measurement values or data to the control unit 13. Electronic unit 1 such as, for example, a computer unit of the control electronics unit 13a, processes the system input magnitudes and relays the control signals to actuator 13b.

The gear is designed, for example, as a phase change gear where the translation phases are changed by means of a gearshift lever 18 or the gear is actuated or operated by means of this gearshift lever 18. Furthermore, at least one sensor 19b is arranged on gearshift lever 18 of the manual gearshift, which detects the gearshift intention and/or the gear position and relays it to the control unit 13. Sensor 19a is hinged on the gearbox and detects the current gear position and/or a gearshift intention. The gearshift intention using at least one of the two sensors 19a, 19b can be accomplished in the following manner. The sensor is a force sensor that detects the force acting upon the gearshift lever 18. Furthermore, the sensor, however, can also be made as a travel or position sensor, whereby the control unit recognizes a gearshift intention from the change in the time of the position signal.

Control unit 13 is at least from time to time in signal connection with all sensors and evaluates the sensor signals and system input magnitudes in such a way that the control unit puts out control or regulating commands to at least one actuator 13b as a function of the current operating point. Drive motor 12 of actuator 13b, for example, an electric motor, receives from the control unit that selects the clutch actuation a sensing magnitude as a function of measurement values and/or system input magnitudes and/or signals of the connected sensor system. For this purpose, a control program is implemented as hardware and/or software in control unit 13; it evaluates the incoming signals and calculates or determines the output magnitudes on the basis of comparisons and/or functions and/or characteristic diagrams.

Control unit 13 advantageously has a torque determination unit, a gear position determination unit, a slip determination unit and/or an operating state determination unit where it is at least in signal contact with one of these units. These units can be implemented by control programs as hardware and/or software so that by means of the incoming sensor signals, one can determine the torque of the drive unit 2 of vehicle 1, the gear position of gearbox 4 as well as the slip that exists in the area of the torque transmission system 3 and the current operating state of vehicle 1. On the basis of the signals from sensors 19a and 19b, the gear position determination unit determines the speed that has currently been set. Sensors 19a, 19b are hinged upon the gearshift lever and/or on adjusting means inside the gear such as, for example, a central selector shaft or sliding selector shaft and the latter detect the speed of these parts, for example, the position and/or the speed. Furthermore, a load level sensor 31 can be arranged on load lever 30, for example, on a gas pedal, which sensor will detect the position of the load lever. Another sensor 32 can work as an idling switch, that is to say, this idling switch 32 is turned on when load lever 30 or the gas pedal is operated and it is disconnected when load lever 30 is not operated so that by means of this digital information, one can recognize whether load lever 30 is being operated. Load lever sensor 31 detects the degree of operation of load lever 30.

Along with load lever 30 and thus the sensors connected with it, FIG. 1 shows a brake operation element 40 to operate the service brake of the parking brake, for example, a brake pedal, a manual brake lever or a hand-operated or foot-operated operation element of the parking brake. At least one sensor 41 is arranged on operating element 40 and monitors the latter's operation. Sensor 41, for example, is a digital sensor, for example, it is made as a switch, and the latter detects that brake-operating element 40 is or is not being operated. A signal device, for example, a brake light, can be in signal connection with sensor 41, signaling that the brake is being operated. This can be done both for the service brake and for the parking brake. Sensor 41, however, can also be made, as an analog sensor and such a sensor, for example, a potentiometer, will determine the degree of operation of the brake-operating element 41. This sensor can also be in signal connection with a signal device.

An embodiment of the invention at hand will be described below, proposing a suitable control for a vehicle power train with a crankshaft starter generator.

Strategies are provided for controlling a vehicle power train, which, for example, comprises a combustion engine, a crankshaft starter generator between two clutches and an automated gearbox (ASG).

The advantages deriving from the use of a starter generator, first of all, include a driver comfort increase (including a torsion oscillation attenuation) and, besides, the possibility of energy recuperation.

A particularly advantageous configuration consists in placing the starter generator between two clutches on the crankshaft because that makes it possible to disconnect the combustion engine during the thrust phases from the power takeoff to recover energy by means of electric braking. This configuration will be described below.

In this configuration, one must keep in mind that the combustion engine should be started upon termination of a recuperation phase without the driver feeling a jerk. The same situation exists when, during a start performed merely via the electrical machine, the combustion engine must be turned on also to increase the traction force. This may be necessary, for example, when starting on a mountain or when the battery load is low.

Meaningful criteria must be defined to be able to decide when the combustion engine must also be turned on during a start.

According to a development of the invention, the vehicle can be started as desired by the driver either purely electrically or with support of the combustion engine. The driver's wish can be transmitted here directly via various channels. For example, as a function of the position of a driving program switch, one can decide how the start is to be performed via the starting mode. For example, when the economy program is activated, one can provide for a purely electrical start, and when the sports program is activated, one can make a start with the combustion engine or also in combination with the electrical drive. One can also select other combinations.

Another possibility consists in analyzing the gas pedal position. Turning the combustion engine on during an electrical start could be activated when, for example, a kickdown switch is operated for more than a certain period of time. The combustion engine can also be turned on when, for example, the pedal position exceeds a certain threshold and/or when an additional threshold is exceeded for more than a specific period of time. It is also conceivable that the combustion engine is turned on when the time change in the pedal position exceeds a certain positive value. Finally, one might also think in terms of any combination of the abovementioned and other possibilities.

Another development of the invention can provide the following: The combustion engine is also turned on during a start when, for example, the control unit notices that the traction force supplied is not what the driver wants. This can be determined preferably by a comparison between the vehicle's longitudinal acceleration, which, for example, is calculated on the basis of the time change in the number of wheel revolutions and the acceleration that is presumed on the basis of the calculated traction force, which is calculated on the basis of the torques of the combustion engine, the electrical machine and the clutches. When, for example, the actual vehicle acceleration for more than a certain span of time is smaller by more than a certain amount than the acceleration assumed on the basis of the calculated traction force, then the turn-on of the combustion engine is initiated.

The following can be provided as part of a further development of the invention: By specifically selecting the two clutches, the combustion engine can be operated without any major loss of comfort for the driver. The idea of turning the engine on after the gearbox clutch has been opened is not acceptable due to the attendant traction force interruption. A better solution, therefore, is to turn the combustion engine on after the gearbox clutch has been specifically placed on the sliding state. During that phase, the power takeoff is disconnected from the drive. In that way via the friction moment of the gearbox clutch, one can furthermore keep the power takeoff torque at a level acceptable for the driver.

Here is one possibility of implementing the invention-based strategy.

First of all, the situation "activation of combustion engine" is recognized. If the gearbox clutch is in the engaged state, then the transmissible torque on the gearbox clutch is so reduced until the clutch changes into the switching state. This reduction can be accomplished both via a torque control and via a travel control on the adjusting device for this clutch.

When the slip phase has been reliably attained (locking time, minimum slippage), the combustion engine can be turned on with the E [electrical] machine. This can be done preferably by means of a controlled closing of the clutch on the engine side, for example, by means of torque control, travel control or the like.

The slipping state on the gearbox clutch should be maintained until the engine clutch has changed to the engaged state and until any possibly developed oscillations in the combustion engine and in the electrical machine have faded sufficiently.

The slippage phase could be maintained by keeping the drive torque constant by means of slip monitoring. It is particularly advantageous when a slip regulation is provided for the gearbox clutch. Here, the drive torque is adjusted by the friction torque on this clutch in keeping with the torque the driver desires. The amount of the slip can be so selected that one can, on the one hand, prevent undesirable sticking and, on the other hand, the output loss on that clutch remains small.

Once the slip phase has been completed (for the condition, see the next to the last paragraph), then the combustion engine and the electrical machine are accelerated, whereby one can get the gearbox clutch to engage by specifically set clutch engagement. The gearbox clutch can be selected here in accordance with the clutch engagement during a starting or gearshift step in a vehicle with automated clutch operation.

This invention-based method can be employed preferably both when starting and when ending the recuperation phases.

Figure 2:
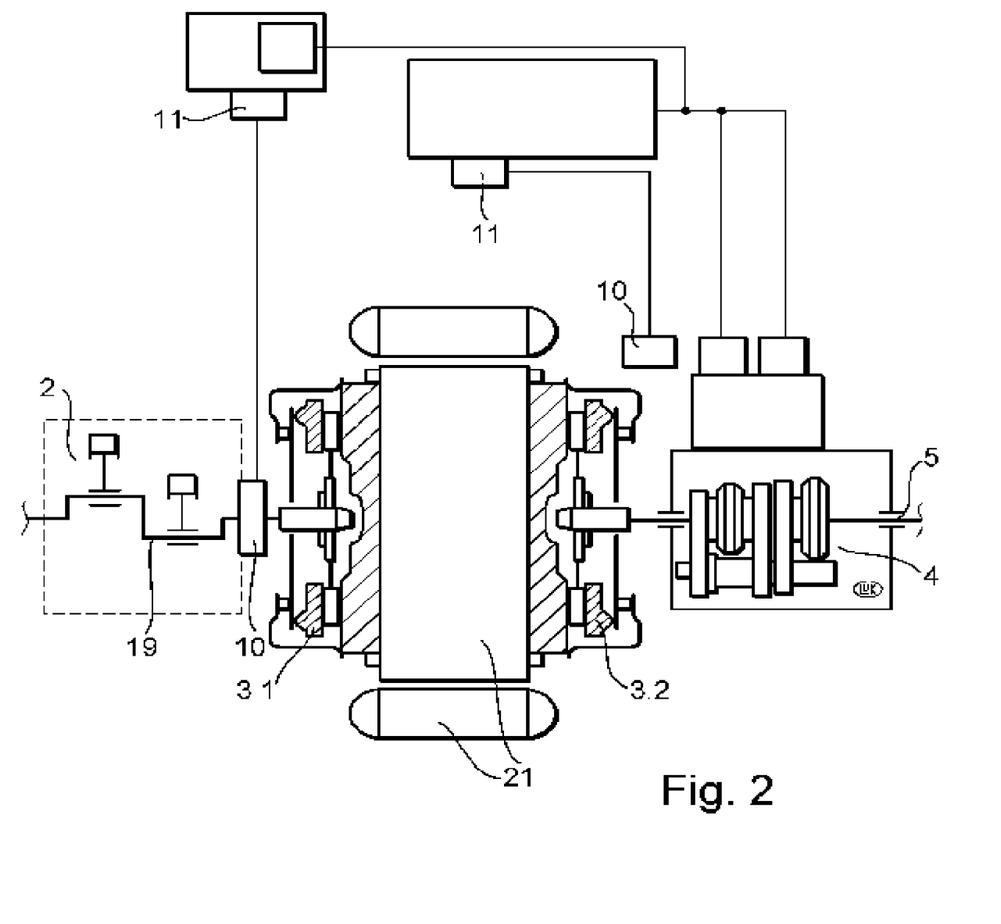
FIG. 2 is a partial cross sectional view of a second embodiment of the device for the operation of a motor vehicle with a drive motor and a gearbox in the power train of the present invention.

FIG. 2 shows a diagram illustrating a possible configuration where a starter generator is arranged between two clutches. The direct-current motors are labeled here M1 to M4. Furthermore, the main cylinder is labeled MC, the auxiliary cylinder is labeled SC and the concentrically arranged auxiliary cylinder is labeled CSC.

Another embodiment of the invention will be described below; here, a pulse start is proposed, for example, in vehicles with a starter generator with slipping clutch.

Figure 3:
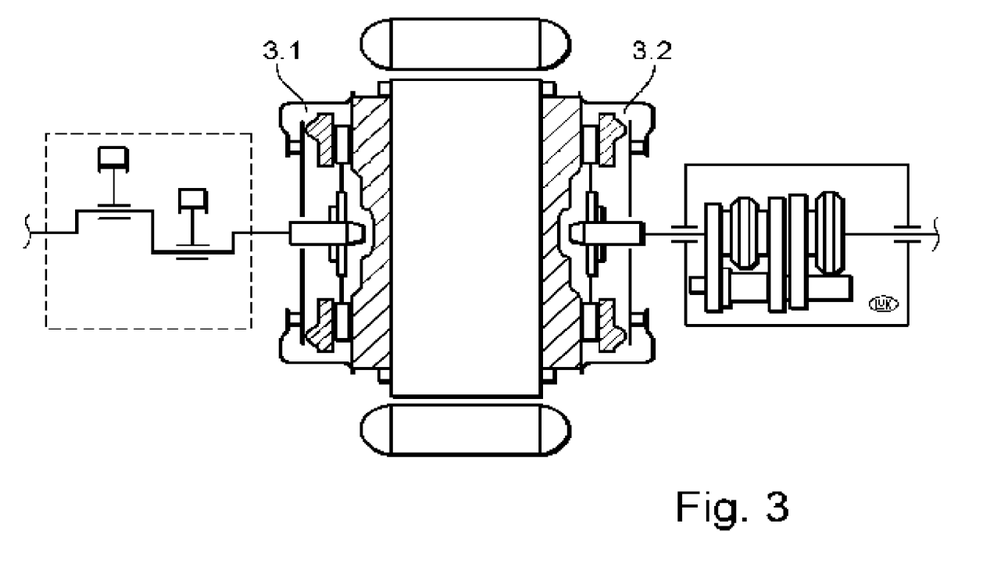
FIG. 3 is a partial cross sectional view of a third embodiment of the device for the operation of a motor vehicle with a drive motor and a gearbox in the power train of the present invention.

There are various possible configurations for using a starter generator. One particular possible illustration is illustrated in FIG. 3. Here, the starter generator is arranged between two clutches K1 and K2. Clutch K1 connects the starter generator with the combustion engine and clutch K2 connects the starter generator with the gearbox.

There are various driving situations such as, for example, when starting with an electric motor, where clutch K2 transmits a torque and where clutch K1, however, is disengaged and the combustion engine is not turned on. When the combustion engine is to be turned on also in this situation, then clutch K1 can be engaged in order to start the combustion engine.

During this process of closing the clutch, the torque can now be so controlled that the driver will perceive the least possible or no effects at all on the power train. This is not mastered easily in terms of steering technique, especially considering the available selection and signal accuracy.

Accordingly, it is proposed according to the invention that clutch K2 be operated in a slipping manner, preferably during the starting phase. Assuming that the slippage is >0 by the end of the starting phase, one can thus make sure that the torque changes on the starter generator/combustion engine side will not have an effect on the power train.

According to a preferred development of the invention, a possible starting procedure can be carried out as follows:

1. The combustion engine is off; clutch K1 is disengaged, clutch K2 is engaged without slip, the vehicle runs exclusively by electric motor drive.

2. Clutch K2 and the starter generator are so selected that a slight slip is adjusted on K2, if possible without any jerk. The transmitting torque to K2 should for this purpose be just as great as the previously delivered drive torque of the electric motor.

3. The torque of the starter generator is raised, and at the same time, clutch K1 is engaged. Here, clutch torque K1 must not be (considerably) above the additional torque of the starter generator. The engine is started.

It is conceivable that the starting procedure might be modified in order further to optimize it.

The following can also be provided as an alternative: First of all, the starter generator is accelerated to a larger number of revolutions, while clutch K2 continues to transmit a constant torque. Then clutch K1 can be engaged. The torque to be transmitted from clutch K1 can now be considerably greater than the additional torque of the starter generator. As a result, the latter is braked and the kinetic energy is transmitted from the starter generator to the combustion engine for the starting procedure. Here, one must watch out that clutch K2 continues to be constantly in slippage, in other words, the number of revolutions of the starter generator must not drop below the gearbox input revolution number.

Additional possibilities are conceivable, for example, when the starter generator is in recuperation operation. In these situations, it is decisive to make sure that clutch K2 is in slippage.

The proposed control strategy can preferably be employed in hybrid vehicles, in vehicles with an electric gearbox (ESG) or the like.

Another embodiment of the invention will be described below; a suitable method is proposed here preferably for the control of the engine clutch in a system with a starter generator, a combustion engine, a double clutch and an automated gearbox (ASG).

One object of the invention is to implement a method for selecting the engine clutch by means of which one can comfortably turn the combustion engine on.

In a system with a starter generator, a combustion engine, a double clutch and an automated gearbox (ASG) such as they are shown already in FIG. 2, the engine clutch primarily is used to actuate the combustion engine. In addition to turning the combustion engine on while the vehicle is standing still to start with the combustion engine and the starter generator, the engine can also be turned on while the vehicle is running in the following situations: end of a recuperation phase (driver steps on gas pedal); a start, which at the first moment is performed purely electrically, can be supported by the combustion engine, for example, when the traction force is not enough.

One can also conceive of other situations where it would be advantageous to turn the combustion engine on.

The gearbox clutch can remain in the engaged state when the engine is turned on in order to keep the energy loss low. Otherwise, the combustion engine can also be turned on with the slipping gearbox clutch.

To activate or turn the combustion engine on, the engine clutch can now be selected by a torque and/or travel control (travel of actuator) where the friction torque that can be transmitted from that clutch will rise preferably in a monotonous fashion or the like. The transition from the sliding state to the engaged state in this case, however, can be very uncomfortable. Here, is one possible reason for that: The transmitting torque of the clutch makes a sudden jump, for example, from a big negative value, for instance, −100 Nm, to a small value that can be positive or negative depending on whether the combustion engine has or has not already generated the torque. This can be expressed by an intensive, for example, positive jerk. This can also be seen in FIG. 4, which shows three diagrams. The other diagram illustrates the vehicle acceleration afzg plotted against the time. The curve indicates the jerk by way of the minimum. The jerk also occurs when a vehicle is towed with a manual gearbox.

Figure 4:
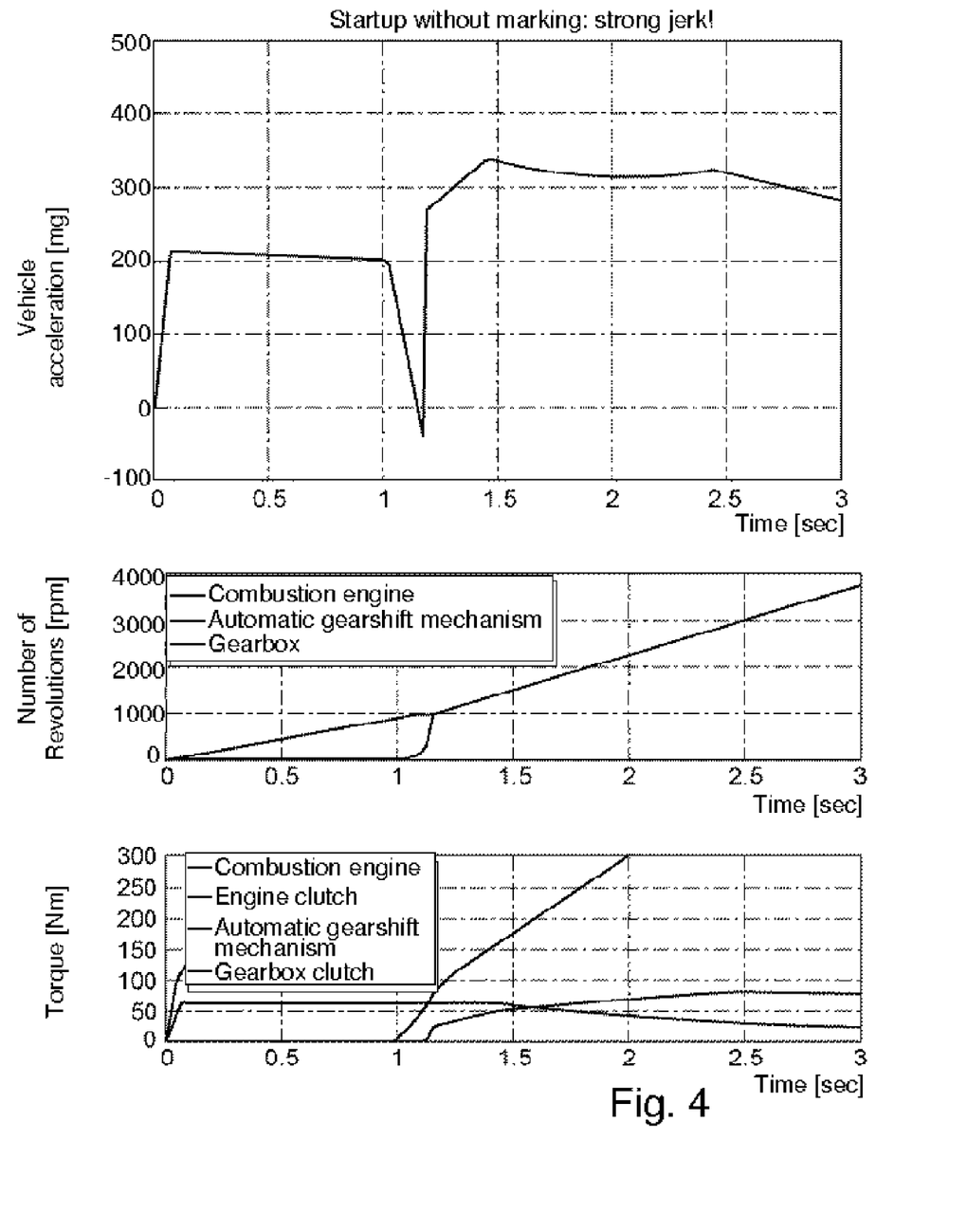
FIG. 4 shows curves of vehicle acceleration, number of revolutions, and torque as a function of time of the combustion engine, the engine clutch, the gearbox clutch, and the asynchronous motor, without a marking point.

The two lower diagrams in FIG. 4 illustrate the curves for the number of revolution of the combustion engine, the gear and the asynchronous motor as well as the curves for the torques of the combustion engine, the engine clutch, the gearbox clutch and the asynchronous motor plotted against the time.

According to the invention, the engine clutch is preferably so selected ("marking" the combustion engine") that the described jerk will be greatly reduced. A method that makes this possible will be described below:

1. The decision to turn the combustion engine on is made by the control of the system.

2. When starting, the (positive) torque of the starter generator is retained. When a recuperation phase has come to an end, the torque of the starter generator can either be raised to a positive value, for example, by a ramp function or by another comfortable transition function, or it can be left at a negative value for the time being.

3. A friction torque can be built up thereafter on the engine clutch by means of a travel or torque control, which friction torque will overcome the drag torque of the combustion engine and will allow the number of revolutions of the combustion engine to rise, something that is described as "marking the combustion engine."

a) During a start, the maximum gradient of the friction torque can be so chosen that the vehicle acceleration will not decline abruptly.

b) When a recuperation phase has ended, the torque of the starter generator can be so chosen by compensation of the clutch torque that the resultant vehicle acceleration will remain positive or negative.

4. Before the number of revolutions of the combustion engine has reached the number of revolutions of the starter generator, the transmissible torque of the clutch can be reduced again, preferably to a value of 0 Nm in order that when the number of revolutions are equal a) there will be no sticking or b) engagement can be done with a very minor jerk. The start of reducing the friction torque can preferably be determined as follows:

The number of revolutions of the combustion engine exceeds a number of revolutions threshold (for example, 300 rpm).

The number of slip revolutions $n_{VM}$–$n_{SG}$ exceeds a threshold value (for example, −500 rpm).

One of the first two conditions is met and the gradient of the number of engine revolutions (or the number of slippage revolutions) exceeds a boundary value.

The travel of the actuator reaches a threshold ("marking point").

A combination of the abovementioned conditions has been met.

The friction torque can be reduced as described in 3a) and 3b) (gradient limitation or torque compensation by the starter generator).

5. If no engagement is brought about during step 4 (variant 4a), then the clutch can be engaged only when the number of revolutions of the combustion engine has exceeded the number of revolutions of the starter generator by a certain value or when, for example, due to a gradient observation, one can make sure that this situation will materialize.

6. Now one can perform a clutch engagement strategy such as it is used in vehicles with electronic clutch management (EKM) or with an automated gearbox (ASG). To engage the clutch, the friction torque is changed via a travel or torque control, and by the same token, the already started combustion engine can be so controlled that the looping of the number of revolutions will be made comfortable.

Figure 5:
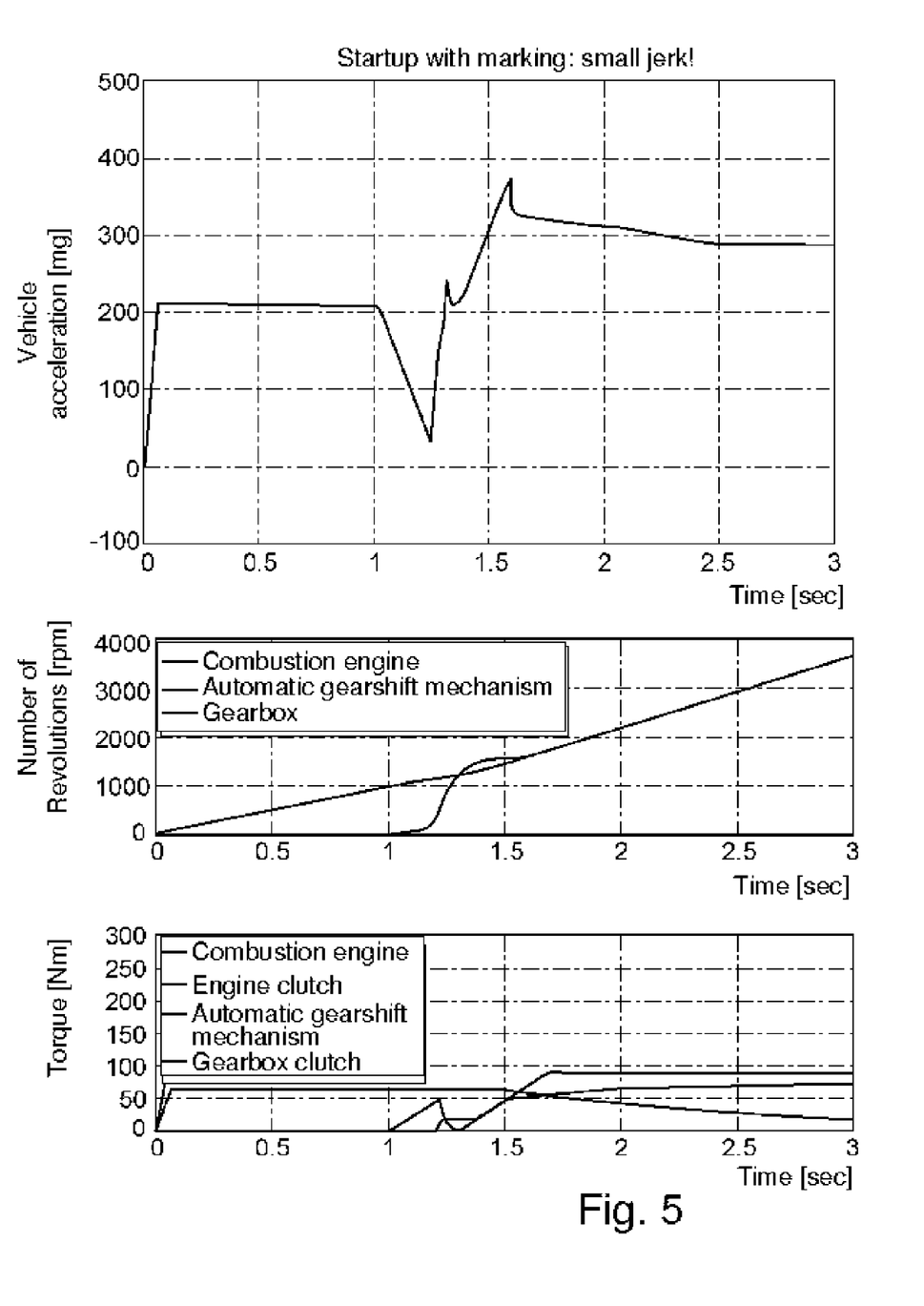
FIG. 5 shows curves of vehicle acceleration, number of revolutions, and torque as a function of time of the combustion engine, the engine clutch, the gearbox clutch, and the asynchronous motor, with a marking point.

The proposed method, especially for selecting the engine clutch, can also be suitably modified in order to optimize it further. FIG. 5 shows how to turn the combustion engine on with a so-called marking with a slight jerk.

FIG. 5 shows three diagrams. The upper diagram illustrates the vehicle acceleration afzg plotted against the time. The curve indicates the rather slight jerk by way of the minimum. Furthermore, in the two lower diagrams in FIG. 5, the curves for the number of revolutions of the combustion engine, the gear and the asynchronous motor as well as the curves for the torques of the combustion engine, the engine clutch, the gearbox clutch and the asynchronous motor are plotted against the time.

A knowledge of the torque moment as a function of the regulating travel is advantageous in order to be able suitably to perform the described selection of the clutch.

Another aspect of the invention consists in the following: The "marking point" is used as the reference point for this function and it is defined as the travel of the regulating device.

This marking point is determined in that the number of engine revolutions is observed during the described starting phase. When this number of revolutions has attained a certain threshold value greater than 0 rpm, for example, n=100 rpm or the like, then the current position of the regulating device is fixed and the marking point is thus determined. This threshold value can also be the smallest number of revolutions or the like that can be resolved with the particular measurement principle.

The value of the point thus determined can preferably be stored in a volatile memory or the like for the further development of the driving cycle and/or in a nonvolatile memory for subsequent driving cycles. During another clutch control step, the required values for the regulating unit of the clutch can be referred to that point. In that way, for example, after reaching the marking point, the regulating travel, as mentioned in Step 4, can again be reduced. By the same token, reducing the adjusting speed shortly prior to attaining that point is also conceivable.

The marking point depends very heavily on the drag moment of the engine and thus on the temperature; therefore, one can put into the memory a marking point value that is corrected by one temperature factor and/or offset.

Another possible version of the invention will be described below; here, for example, the data on the number of revolutions of a starter generator are preferably employed to control an automated gearbox (ASG).

One object of the invention can consist of the following: to improve the control in terms of comfort, availability and safety of an automated gearbox (ASG) by using data on the number of revolutions of a starter generator.

The knowledge of the number of gear input revolutions is of the utmost importance, especially in an ASG system. This is why in many cases a sensor is attached directly to the gear in order to determine that number of revolutions. For reasons of cost, for example, one might do without the sensor, and in that case, the number of gear input revolutions can be determined from the number of revolutions of the power takeoff and the currently existing gear translation.

The number of revolutions of the rotor may be required to control a starter generator that, for example, is arranged between the combustion engine and the gear. The starter generator can be separated from the combustion engine and the gear by one or two clutches.

In a system with one clutch between the starter generator and the gear, the number of revolutions of the starter generator is identical to the number of revolutions of the combustion engine. There is therefore no absolute requirement for an additional sensor for the number of revolutions (as compared to a vehicle without a starter generator).

In a system with a clutch between the starter generator and the combustion engine, the number of revolutions of the starter generator is identical to the number of revolutions of the gearbox input. An additional number of revolutions sensor therefore is required only to a limited extent.

In a system with a double clutch between the starter generator and the gearbox, the number of revolutions of the starter generator is in some situations identical to the number of revolutions of the combustion engine and, in some situations, it is identical to the number of revolutions of the gearbox input. An additional number-of-revolutions sensor is therefore absolutely necessary.

A directional recognition device may therefore be advantageous for a four-quadrant operation of the starter generator.

According to the invention, it can be provided that the number of revolutions and possibly the rotation direction data supplied by the starter generator will be used for the ASG control. In this way, one can improve the system's comfort, reliability and availability. We will consider here primarily (but not exclusively) a system with a double clutch, which is illustrated by way of example in FIG. 2.

The number-of-revolutions data of the starter generator can be used in a preferred manner with the following strategies:

1. In case of an unexpected number-of-revolutions difference between the combustion engine and the starter generator and/or between the starter generator and the number of wheel revolutions, preferably considering the current gear translation ratio, the engine and/or the gearbox clutch can be further meshed to reduce the slip.

2. In a gearshift procedure with the clutch engaged between the starter generator and the gearbox input, the moment of starting and ending the synchronization procedure can be detected. This can be used advantageously for controlling the gearshift actuator, the adaptation of the synchronous points also already during a first startup or the like.

3. When the clutch between the starter generator and the gearbox input is engaged, then, with the help of the number of revolutions of the wheels, one can determine the speed that was set in the gearbox and this can thus be used to render the position of the gearbox setting device plausible.

4. When the clutch between the starter generator and the gearbox input is engaged, the signals of the sensors for the number of revolutions of the wheels can be rendered plausible and/or can possibly be replaced. When, for example, the signal of a sensor for the number of wheel revolutions has failed, then, if the speed has been adjusted and if it is known, one can determine the missing wheel revolution number from the revolution number signal of the starter generator.

5. When the wheel revolution number sensor fails, one can switch to emergency running where the gearbox clutch is always kept engaged. Then the vehicle speed, except when the gearbox is idling, can be calculated via the number of revolutions of the starter generator and the current gear translation ratio.

6. When the direction of the starter generator is identified, then in case of a purely electrical start where the engine clutch is disengaged and the gearbox clutch is engaged, one can check whether the vehicle is being set in motion in keeping with the driver's desire and if one possibly should take countermeasures. When, for example, during a start in a forward speed it is found that the vehicle rolls back, then one can conclude that one is making an uphill start. By way of a reaction, one can preferably increase the current flow of the electrical motor in order to increase the drive torque in the driver's desired direction (hillholder).

7. The starter generator's number-of-revolutions data can, in combination with the engine and/or the wheel revolution numbers, be used to estimate the temperature of the engine and/or gearbox clutch. For this purpose, for example, one can use a temperature model such as it is already used in vehicles with electronic clutch management (EKM) or with an automated gearshift (ASG).

In the following, we will describe yet another embodiment of the invention at hand, where we propose a vehicle with a hybrid system or an ESG system with the same starting characteristics when starting with the combustion engine and with the electric motor.

In this way, regardless of which power engine is used for starting, a reproducible starting sensation can be transmitted to the driver.

In another possible strategy, for example, in case of starting control, one can predetermine a clutch torque curve that is a function of the pedal value, in particular, when starting with the combustion engine or, as an alternative, the same torque curve in case of a start with the electric motor.

In the case of electronic clutch management (EKM) or in case of an automated gearshift (ASG), one can use a starting strategy where the clutch slip is reduced in any case so that one can assure a nonjerking transition from slip to sticking and one can avoid the fluctuations in the number of revolutions or the torque of the combustion engine as well as in the power train.

A reproducible acceleration performance during starting can thus be implemented advantageously with this strategy.

Furthermore, in a hybrid drive system, likewise where one can start both with the combustion engine and with the electric motor, the task is to develop strategies that will give the driver a reproducible starting behavior regardless of the motor selected.

This applies especially when starting with the gas pedal operated. The abovementioned clutch control brings about a creeping action when the idling switch is operated (with the gas pedal not operated), something that can be expressed for both motors equally as a torque buildup that is a function of the time.

There is a plurality of possible combinations here. For instance, when starting with the combustion engine, one can use the same strategy as for the EKM/ASG system, while the clutch is preferably engaged as a function of the number of revolutions.

In a combined start with the combustion engine and the electric motor, one can also build up the power train torque by means of the engagement of the starting clutch that is a function of the number of revolutions. The coordination of the two drive machines for the purpose of expressing the driver's desire is handled via a higher-level coordinator. From the viewpoint of starting behavior, there is thus no difference with respect to a pure combustion engine start. The clutch control here processes the added torque of the combustion engine and the electric motor.

In case of a start purely by electric motor, the starting clutch can be engaged from the very beginning and the power train torque can be built up by the electric motor alone.

There is a special program part in the control that simulates the run-up of the combustion engine on the basis of the driver's wish. Based on this information and the starting parameters (starting characteristic) put in the control, one can then calculate the corresponding required clutch torque. The latter is then set in case of a pure electric motor start, however, not on the clutch, which is engaged, but rather on the electric motor.

Figure 6:
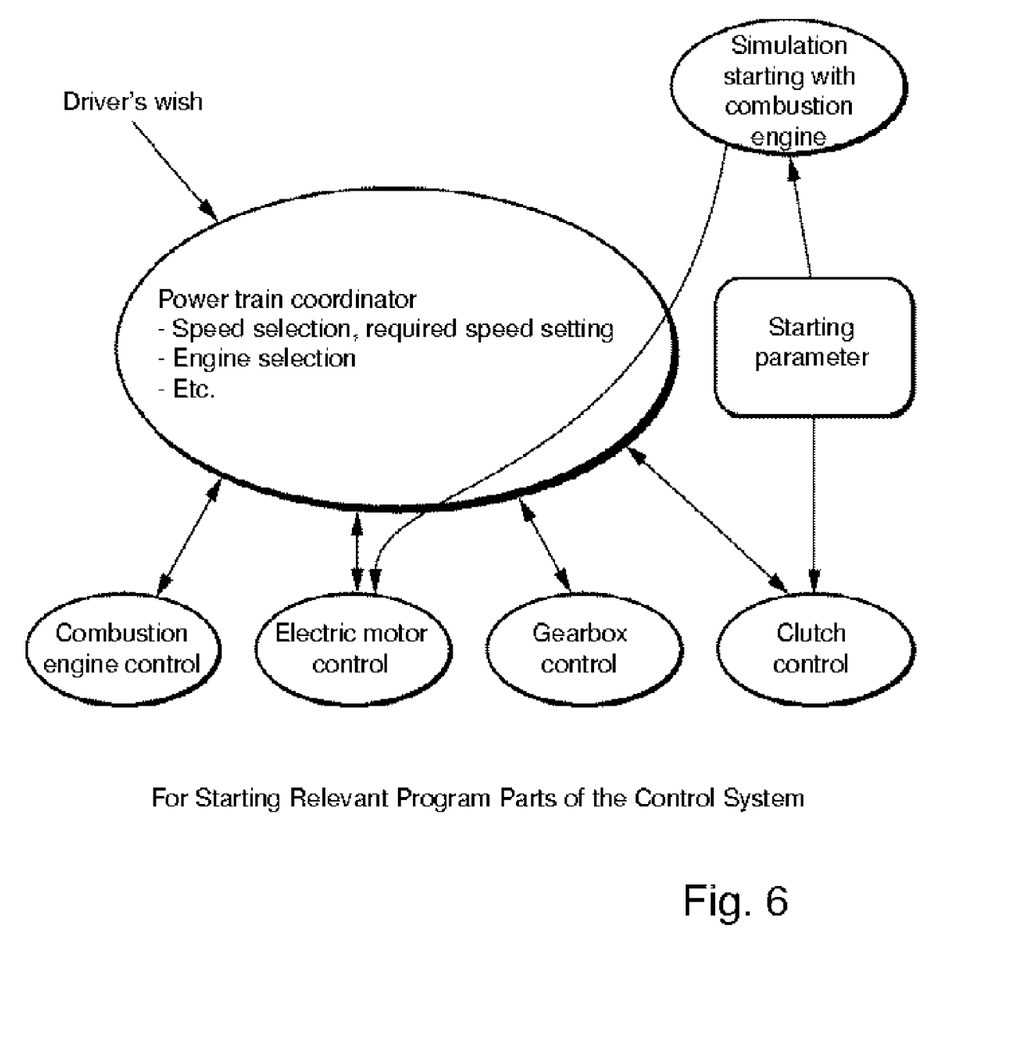
FIG. 6 is a block diagram illustrating how various program parts of the control software are interlinked for a corresponding vehicle; and, FIG. 7 is a flow diagram of a first embodiment of the program sequence for the calculation of the electric motor starting torque.

FIG. 6 is a diagram illustrating how the various program parts of the control software are interlinked for a corresponding vehicle. There is a higher-level power train coordinator that is responsible for predetermining the speeds, for the distribution between the two drive motors, etc. The controls of the two driver motors as well as of the gearbox and the clutch are supplied with data on the required speed, the required torques, etc., from this coordinator.

The additional program part accesses the same application parameters for the vehicle's starting behavior as does the clutch control. The torque resulting from the simulation is then transmitted either directly or via the coordinator, for example, to the electric motor control, and is processed there.

Each of these program parts can basically consist of several modules. All program parts in FIG. 6 can be in one control unit or can be distributed over several control units that communicate with each other. It is also possible that the submodules of a program part may be distributed over various control units, that is to say, that the control units "divide the work among themselves."

It must be noted here that the functions associated with the programs are present in the entire control system. The most varied embodiment possibilities are to be found here.

For example, it is conceivable that, instead of simulation, one might also use other practical implementation or calculation possibilities for the required torque. In this way, for example, one can put in a fixed characteristic or a simple dynamic computation module whose parameters can possible be calculated offline. For this purpose, one can preferably use the corresponding application parameters from the clutch control.

Figure 7:
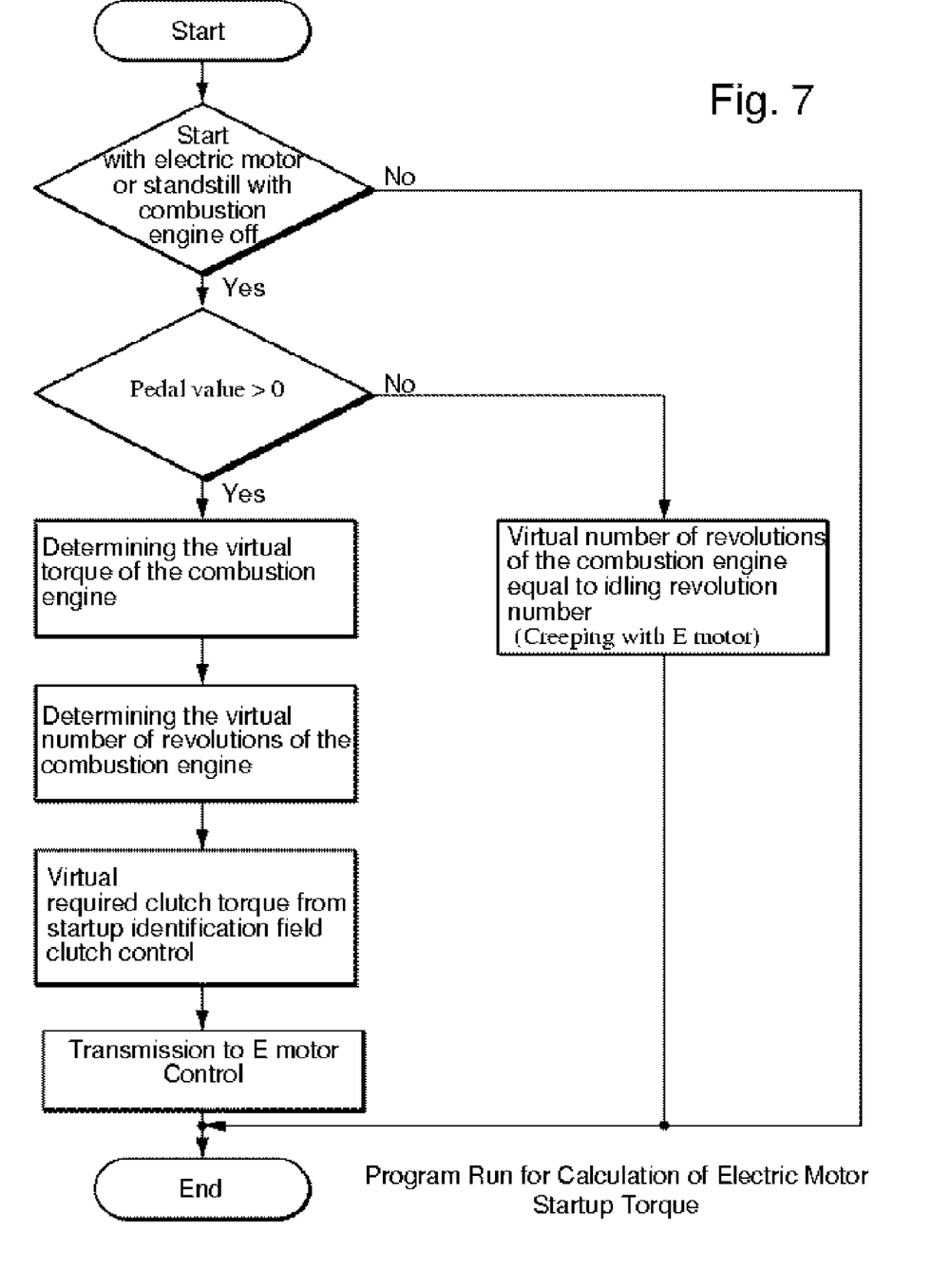

FIG. 7 shows a possible program sequence in the program part for the simulation of the combustion engine where the program run is provided for the calculation of the electric motor starting torque.

Here one can interrogate by way of an entry condition whether there is at all any purely electric motor start or whether it is impending.

On the basis of the driver's desire (pedal value or idling switch), it is then decided whether for the virtual number of revolutions of the electric motor one uses the latter's idling revolution number ($n_{VM\_virt}=n_{VM\_idling}$, assuring the initial condition with subsequent start if the driver has not yet stepped on the gas pedal) or whether there is a calculation of the electric motor torque fitting in with the clutch control during the start.

In simulating the combustion engine, one can preferably calculate the latter's virtual torque on the basis of the identification field of the engine $$M_{VM\_virt}=M_{VM}(n_{VM\_virt}, \text{pedal\_value})$$

and by integration of the motion equation, one can also calculate the new virtual number of revolutions:

$$n_{VM\_virt\_alt} = n_{VM\_virt}$$
$$n_{VM\_virt} = n_{VM\_virt\_alt} + \frac{30 \cdot M_{VM\_virt}}{\pi \cdot J_{VM}} \cdot \Delta T$$

These data are then used to calculate the virtual required clutch torque in accordance with the starting identification field of the clutch control.

$$M_{R\_required\_virt}=M_{starting}(n_{VM\_virt}, n_{gear})$$

The electric motor control receives the value of the virtual required clutch torque as a given required value for the electric motor. As a result, the vehicle, when starting with the electric motor, will behave as it would behave in case of a combustion engine start with the same pedal value.

The core idea behind this simulation is this: "What would happen if we were to start with the combustion engine?" In calculating the virtual torque and the virtual number of revolutions of the combustion engine, one can also use other information channels such as, for example, data from the engine control of the combustion engine or other equations such as, for example, another motion integration algorithm.

The invention-based concept can be employed advantageously in a vehicle with a hybrid drive. Furthermore, the starting strategy for electrical starts can be employed with a starter generator or in vehicles with an electronic gearshift (ESG).

The patent claim submitted with the application is a formulation proposal without regard as to the attainment of additional patent protection. Applicant reserves the right to claim additional feature combinations hitherto disclosed only in the description and the drawing.

Advantageous developments with a view to the state of the art on the priority date can form separate and independent inventions; applicant therefore reserves the right to make them the object of dependent and/or independent claims or partial declarations. They can furthermore also contain independent inventions that display a design independent of the objects in the preceding forms.

The exemplary embodiments are not to be construed as a restriction of the invention. Instead, in the context of the disclosure at hand, numerous changes and modifications are possible, in particular, those variants, elements and combinations and/or materials that, for example, by way of combination or modification of individual features or electric elements or process steps described in conjunction with those describe in the general specifications and the embodiments as well as the claim and contained in the drawing, the expert can figure out with a view to the solution of the problem and that by means of combinable features result in a new object or new process steps or process step sequences also to the extent that they relate to production, testing and working methods.

What is claimed is:

1. In a motor vehicle having a crankshaft starter generator arranged directly between a drive unit and a gearbox, and separated by an engine clutch and a gearbox clutch of a crankshaft, wherein said motor vehicle has a power takeoff shaft, a method for operation of said motor vehicle comprising the step of operating the starter generator between the two clutches to turn on the drive unit at a moment in time when the gearbox clutch changes into a slipping state and said power takeoff shaft is disconnected from the drive unit.

2. The method recited in claim 1 wherein the drive unit is an internal combustion unit.

3. The method according to claim 2, wherein the starter generator is operated to start the combustion engine during an electrical start at a moment when a kickdown switch is operated for a certain period of time.

4. The method according to claim 2, wherein the starter generator for starting the combustion engine is operated during an electrical start at a moment when a gas pedal exceeds a defined position or when it is operated beyond a defined span of time.

5. The method according to claim 2, wherein the starter generator is operated to start the combustion engine when a measured vehicle acceleration does not correspond to a defined required vehicle acceleration.

6. The method according to claim 2, wherein turning on the engine clutch, arranged between the starter generator and the combustion engine, is subject to a logic control depending on fuel consumption.

7. The method according to claim 2, wherein turning on the engine clutch, arranged between the starter generator and the combustion engine, is subject to a logic control depending on a selected driving mode.

8. The method according to claim 2, wherein prior to a time when a number of revolutions of the combustion engine and a number of revolutions of the starter generator are equal, a transmissible torque of the gearbox clutch is again reduced down to a slippage state.

9. The method according to claim 2, wherein a defined revolution number threshold of the combustion engine is exceeded.

10. The method according to claim 2, wherein a gradient of the engine or slippage revolution number exceeds a boundary value.

11. The method according to claim 2, wherein a value, determined for starting up the combustion engine is deposited from a control in a volatile memory.

12. The method according to claim 2, wherein for a period of starting up the combustion engine, a temperature factor is deposited in a memory of a control device.

13. The method according to claim 2, wherein differences between a number of revolutions of the starter generator and a number of revolutions of the combustion engine, data from a wheel sensor, as well as temperatures of the engine and gearbox clutches are acquired and are processed in a gearbox control.

14. The method according to claim 1, wherein starting with an electrical start of the vehicle, the gearbox clutch, located between the gearbox and the starter generator, is operated in a slipping manner until such time as the gearbox clutch operates without slip.

15. The method according to claim 1, wherein as the vehicle is started, and as torque of the starter generator is either retained or changed, simultaneously, a friction torque is built up on the engine clutch via a travel or torque control.

16. The method according to claim 1, wherein a defined slippage revolution number threshold value is exceeded.

17. The method according to claim 1, wherein a program part is deposited in a control, which on the basis of defined starting parameters, calculates a particular necessary required clutch moment.

18. The method according to claim 17, wherein the program part preferably comprises several modules and is either located in a control unit or is subdivided over several control units that communicate with each other.

19. The method according to claim 17, wherein the program part with its associated functions are present in the entire system.

20. The method according to claim 1, wherein controls of the drive unit, the gearbox as well as at least one clutch are supplied with data by one coordinator.

21. The method according to claim 1, wherein a gearbox input revolution number is acquired by means of a sensor attached to the gearbox.

22. An apparatus for operating a motor vehicle comprising:
a drive unit;
an engine clutch;
a gearbox clutch;
a crankshaft;
a clutch gearbox;
a power take-off shaft; and,
a crankshaft starter generator arranged directly between said drive unit and said clutch gearbox, and separated by said engine clutch and said gearbox clutch and arranged to turn on said drive unit at a moment in time when a gearbox clutch changes to a slipping state and said power take-off shaft is disconnected from said drive unit.

23. The apparatus for operating a motor vehicle according to claim 22, wherein said drive unit is an internal combustion engine.

24. The apparatus for operating a motor vehicle according to claim 22, wherein said drive unit is a motor.

25. In a motor vehicle having a crankshaft starter generator operatively arranged between an engine clutch and a gearbox clutch of a crankshaft, a drive unit, a clutch gearbox, and a power takeoff shaft, a method for operation of said motor vehicle comprising the step of operating the starter generator between the two clutches to turn on the drive unit at a moment in time when the gearbox clutch changes into a slipping state and said power takeoff shaft is disconnected from the drive unit, wherein the drive unit is an internal combustion unit and the starter generator is operated to start the combustion engine when a measured vehicle acceleration does not correspond to a defined required vehicle acceleration.

26. The method according to claim 25, wherein prior to a time when a number of revolutions of the combustion engine and a number of revolutions of the starter generator are equal, a transmissible torque of the gearbox clutch is again reduced down to a slippage state.

27. The method according to claim 25, wherein a defined slippage revolution number threshold value is exceeded.

28. The method according to claim 25, wherein a gradient of the engine or slippage revolution number exceeds a boundary value.

29. The method according to claim 25, wherein differences between a number of revolutions of the starter generator and a number of revolutions of the combustion engine, data from a wheel sensor, as well as temperatures of the engine and gearbox clutches are acquired and are processed in a gearbox control.

* * * * *

UNITED STATES PATENT AND TRADEMARK OFFICE
CERTIFICATE OF CORRECTION

| | |
|---|---|
| PATENT NO. | : 7,160,225 B2 |
| APPLICATION NO. | : 10/711851 |
| DATED | : January 9, 2007 |
| INVENTOR(S) | : Berger et al. |

It is certified that error appears in the above-identified patent and that said Letters Patent is hereby corrected as shown below:

On the cover page of the Letters Patent (75) Assignee: LuK Lamellen und Kupplungsbau Beteiligungs is incorrect.

It should read: LuK Lamellen und Kupplungsbau Beteiligungs KG

Signed and Sealed this

Fifteenth Day of May, 2007

JON W. DUDAS
*Director of the United States Patent and Trademark Office*